US009599206B2

(12) United States Patent
Depraete

(10) Patent No.: US 9,599,206 B2
(45) Date of Patent: Mar. 21, 2017

(54) TORQUE CONVERTER AND HYDROKINETIC TORQUE COUPLING DEVICE HAVING TURBINE-PISTON LOCKUP CLUTCH, AND RELATED METHODS

(71) Applicant: VALEO EMBRAYAGES, Amiens (FR)

(72) Inventor: Alexandre Depraete, Bloomfield, MI (US)

(73) Assignee: Valeo Embrayages (FR)

( * ) Notice: Subject to any disclaimer, the term of this patent is extended or adjusted under 35 U.S.C. 154(b) by 106 days.

(21) Appl. No.: 14/562,286

(22) Filed: Dec. 5, 2014

(65) Prior Publication Data

US 2016/0160978 A1   Jun. 9, 2016

(51) Int. Cl.
*F16H 45/02* (2006.01)

(52) U.S. Cl.
CPC ..... *F16H 45/02* (2013.01); *F16H 2045/0205* (2013.01); *F16H 2045/0215* (2013.01); *F16H 2045/0231* (2013.01); *F16H 2045/0247* (2013.01); *F16H 2045/0278* (2013.01)

(58) Field of Classification Search
CPC ............. F16H 45/02; F16H 2045/0205; F16H 2045/0215; F16H 2045/0231; F16H 2045/0278
USPC .................................. 192/3.28–3.31, 109 R
See application file for complete search history.

(56) References Cited

U.S. PATENT DOCUMENTS

| 2,130,895 | A | 9/1938 | Ness |
| 2,860,747 | A | 11/1958 | Kelley |
| 2,992,713 | A | 7/1961 | Stump et al. |
| 3,041,892 | A | 7/1962 | Schjolin |

(Continued)

FOREIGN PATENT DOCUMENTS

| DE | 1550957 A1 | 7/1969 |
| DE | 2245901 A1 | 4/1974 |

(Continued)

OTHER PUBLICATIONS

U.S. Appl. No. 14/510,244, filed Oct. 9, 2014, First Named Inventor: Alexandre Depraete.

(Continued)

*Primary Examiner* — Richard Lorence
(74) *Attorney, Agent, or Firm* — Berenato & White, LLC

(57) ABSTRACT

A hydrodynamic torque coupling device with lockup clutch is provided that includes an impeller, an axially displaceable turbine-piston, and a stop feature. The turbine-piston includes a turbine-piston shell and a turbine-piston flange. The turbine-piston is axially displaceable relative to the impeller to move an engagement surface region of the turbine-piston towards and away from an engagement surface region of the impeller for positioning the torque converter respectively into and out of a lockup mode. When the turbine-piston is out of the lockup mode, a fluid passageway connecting a torus chamber to a damper chamber extends between the engagement surface regions and between flow restriction surface regions of the turbine-piston and impeller. At a maximum axial displacement position out of lockup (Continued)

mode, a gap between the engagement surface regions is greater than a gap between the flow restriction surface regions.

20 Claims, 4 Drawing Sheets

(56) References Cited

U.S. PATENT DOCUMENTS

| | | | |
|---|---|---|---|
| 3,252,352 | A | 5/1966 | General et al. |
| 4,041,701 | A | 8/1977 | Goto et al. |
| 5,713,442 | A | 2/1998 | Murata et al. |
| 5,813,505 | A | 9/1998 | Olsen et al. |
| 6,026,940 | A | 2/2000 | Sudau |
| 6,915,886 | B2 | 7/2005 | Dacho et al. |
| 7,191,879 | B2 | 3/2007 | Arhab et al. |
| 7,445,099 | B2 | 11/2008 | Maucher et al. |
| 8,276,723 | B2 | 10/2012 | Verhoog et al. |
| 8,479,901 | B2 * | 7/2013 | Engelmann ............ F16F 15/145 192/3.28 |
| 2003/0168298 | A1 | 9/2003 | Holler et al. |
| 2003/0168299 | A1 | 9/2003 | Holler et al. |
| 2004/0011032 | A1 | 1/2004 | Holler et al. |
| 2006/0086584 | A1 | 4/2006 | Maucher et al. |
| 2012/0241273 | A1 * | 9/2012 | Kawahara ............... F16H 45/02 192/3.29 |
| 2013/0230385 | A1 | 9/2013 | Lindemann et al. |
| 2014/0014454 | A1 | 1/2014 | Davis |
| 2014/0014455 | A1 | 1/2014 | Davis |
| 2014/0097055 | A1 | 4/2014 | Lindemann et al. |
| 2014/0110207 | A1 | 4/2014 | Davis |
| 2015/0362041 | A1 | 12/2015 | Lee et al. |

FOREIGN PATENT DOCUMENTS

| | | | |
|---|---|---|---|
| DE | 10226860 | A1 | 12/2003 |
| EP | 0125428 | A1 | 11/1984 |
| EP | 1744074 | | 1/2007 |
| FR | 668839 | A | 11/1929 |
| FR | 2317556 | A1 | 2/1977 |
| FR | 2428188 | A1 | 1/1980 |
| FR | 2561342 | A1 | 9/1985 |
| FR | 2706967 | A1 * | 12/1994 ............ F16D 47/06 |
| FR | 2736982 | A1 | 1/1997 |
| FR | 2787854 | A1 | 6/2000 |
| GB | 598811 | | 2/1948 |
| JP | 58-131466 | A | 8/1983 |
| KR | 101311531 | B1 | 9/2013 |
| WO | WO2004018897 | | 3/2004 |
| WO | 2004046574 | A1 | 6/2004 |

OTHER PUBLICATIONS

U.S. Appl. No. 14/510,267, filed Oct. 9, 2014, First Named Inventor: Alexandre Depraete.
U.S. Appl. No. 14/522,189, filed Oct. 23, 2014, First Named Inventor: Alexandre Depraete.
U.S. Appl. No. 14/522,263, filed Oct. 23, 2014, First Named Inventor: Alexandre Depraete.
U.S. Appl. No. 14/522,302, filed Oct. 23, 2014, First Named Inventor: Alexandre Depraete.
U.S. Appl. No. 14/522,333, filed Oct. 23, 2014, First Named Inventor: Alexandre Depraete.
U.S. Appl. No. 14/522,361, filed Oct. 23, 2014, First Named Inventor: David Werthman.
U.S. Appl. No. 14/522,372, filed Oct. 23, 2014, First Named Inventor: Alexandre Depraete.
U.S. Appl. No. 14/522,393, filed Oct. 23, 2014, First Named Inventor: Alexandre Depraete.
U.S. Appl. No. 14/561,961, filed Dec. 5, 2014, First Named Inventor: Alexandre Depraete.
U.S. Appl. No. 14/562,022, filed Dec. 5, 2014, First Named Inventor: Alexandre Depraete.
U.S. Appl. No. 14/562,064, filed Dec. 5, 2014, First Named Inventor: Alexandre Depraete.
U.S. Appl. No. 14/562,099, filed Dec. 5, 2014, First Named Inventor: Alexandre Depraete.
U.S. Appl. No. 14/562,136, filed Dec. 5, 2014, First Named Inventor: Alexandre Depraete.
U.S. Appl. No. 14/562,216, filed Dec. 5, 2014, First Named Inventor: Sungchul Lee.
U.S. Appl. No. 14/562,253, filed Dec. 5, 2014, First Named Inventor: Alexandre Depraete.
U.S. Appl. No. 14/687,602, filed Apr. 15, 2015, First Named Inventor: Alexandre Depraete.
Lindemann et al., "iTC—Innovative Solutions for Torque Converters Pave the Way into the Future", Torque Converter 20, pp. 280-301.

* cited by examiner

TORQUE CONVERTER AND HYDROKINETIC TORQUE COUPLING DEVICE HAVING TURBINE-PISTON LOCKUP CLUTCH, AND RELATED METHODS

BACKGROUND OF THE INVENTION

1. Field of the Invention

The present invention generally relates to torque converters and hydrokinetic torque coupling devices, and more particularly to torque converters and hydrokinetic torque coupling devices including a turbine-piston lockup clutch for mechanically coupling driving and driven shafts.

2. Description of the Related Art

Generally, vehicles with automatic transmissions are equipped with a hydrokinetic torque coupling device for fluidly coupling the driving shaft of an engine to a driven shaft of a transmission. Lockup clutches are known for mechanically coupling the driving and driven shafts under certain operating conditions. Lockup clutches and their operation are described in, for example, U.S. Pat. Nos. 8,276,723 and 7,191,879.

While hydrokinetic torque coupling devices with lockup clutches have proven to be useful for vehicular driveline applications and conditions, improvements that may enhance their performance and cost are possible.

As taught hereinbelow, such improvements may derive from, for example, reducing the spatial requirements of components of the hydrokinetic torque coupling device and/or consolidating functions of two or more components into a single component.

BRIEF SUMMARY OF THE INVENTION

According to a first aspect of the invention, a hydrokinetic torque coupling device for coupling together a driving shaft and a driven shaft and being rotatable about a rotational axis is provided. The hydrokinetic torque coupling device includes a casing and a torque converter, both of which are coaxially aligned with and rotatable about the rotational axis. The casing has a damper chamber and includes an impeller shell and a casing shell connected to and non-rotatable relative to the impeller shell. The torque converter has a torus chamber and includes an impeller, an axially displaceable turbine-piston coaxially aligned with and hydrodynamically drivable by the impeller to rotate about the rotational axis, and a stop feature configured to prevent axial displacement of the turbine-piston in a direction away from the impeller beyond a maximum axial displacement position. The impeller includes an impeller shell having a first engagement surface region and a first flow restriction surface region. The turbine-piston includes a turbine-piston shell and a turbine-piston flange. The turbine-piston flange has a second engagement surface region and a second flow restriction surface region facing the first engagement surface region and the first flow restriction surface region, respectively. The turbine-piston is axially displaceable relative to the impeller to move the second engagement surface region towards and away from the first engagement surface region for positioning the hydrokinetic torque coupling device between a lockup mode in which the turbine-piston is mechanically locked to so as to be non-rotatable relative to the impeller and a non-lockup mode in which a fluid passageway extends through a first gap between the first and second engagement surface regions and a second gap between the first and second flow restriction surface regions to place the torus chamber and the damper chamber into fluid communication with one another. Axial displacement of the turbine-piston into the maximum axial displacement position provides the first gap with a greater width than the second gap.

A second aspect of the invention provides a method of assembling a hydrokinetic torque coupling device for coupling a driving shaft and a driven shaft together. The method involves providing a torque converter having a torus chamber and including an impeller having an impeller shell with a first engagement surface region and a first flow restriction surface region, an axially displaceable turbine-piston including a turbine-piston shell and a turbine-piston flange with a second engagement surface region and a second flow restriction surface region facing the first engagement surface region and the first flow restriction surface region, respectively, and a stop feature configured to prevent axial displacement of the turbine-piston in a direction away from the impeller beyond a maximum axial displacement position. The method further involves operatively connecting the torque converter to a casing shell and a damper assembly to establish a damper chamber in which the damper assembly is situated. The turbine-piston is axially displaceable relative to the impeller to move the second engagement surface region towards and away from the first engagement surface region for positioning the hydrokinetic torque coupling device respectively between a lockup mode in which the turbine-piston is mechanically locked to so as to be non-rotatable relative to the impeller and a non-lockup mode in which a fluid passageway extends through a first gap between the first and second engagement surface regions and a second gap between the first and second flow restriction surface regions to place the torus chamber and the damper chamber into fluid communication with one another. Axial displacement of the turbine-piston into the maximum axial displacement position provides the first gap with a greater width than the second gap.

A third aspect of the invention provides a method of operating a hydrokinetic torque coupling device including a torque converter, a casing shell, and a damper assembly situated in a damper chamber. The torque converter has a torus chamber and includes an impeller having an impeller shell with a first engagement surface region and a first flow restriction surface region, an axially displaceable turbine-piston having a turbine-piston shell and a turbine-piston flange with a second engagement surface region and a second flow restriction surface region facing the first engagement surface region and the first flow restriction surface region, respectively, and a stop feature configured to prevent axial displacement of the turbine-piston in a direction away from the impeller beyond a maximum axial displacement position. The method involves axially displacing the turbine-piston towards the impeller to move the second engagement surface axially towards and into frictional engagement with the first engagement surface to mechanically and non-rotatably lock the turbine-piston to the impeller. The method further involves axially displacing the turbine-piston away from the impeller to move the turbine-piston into the maximum axial displacement position in which a fluid passageway extends through a first gap between the first and second engagement surface regions and a second gap between the first and second flow restriction surface regions to place the torus chamber and the damper chamber into fluid communication with one another. In the maximum axial displacement position, the first gap is greater in width than the second gap.

Other aspects of the invention, including apparatus, devices, systems, coupling devices, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

Figure 1:
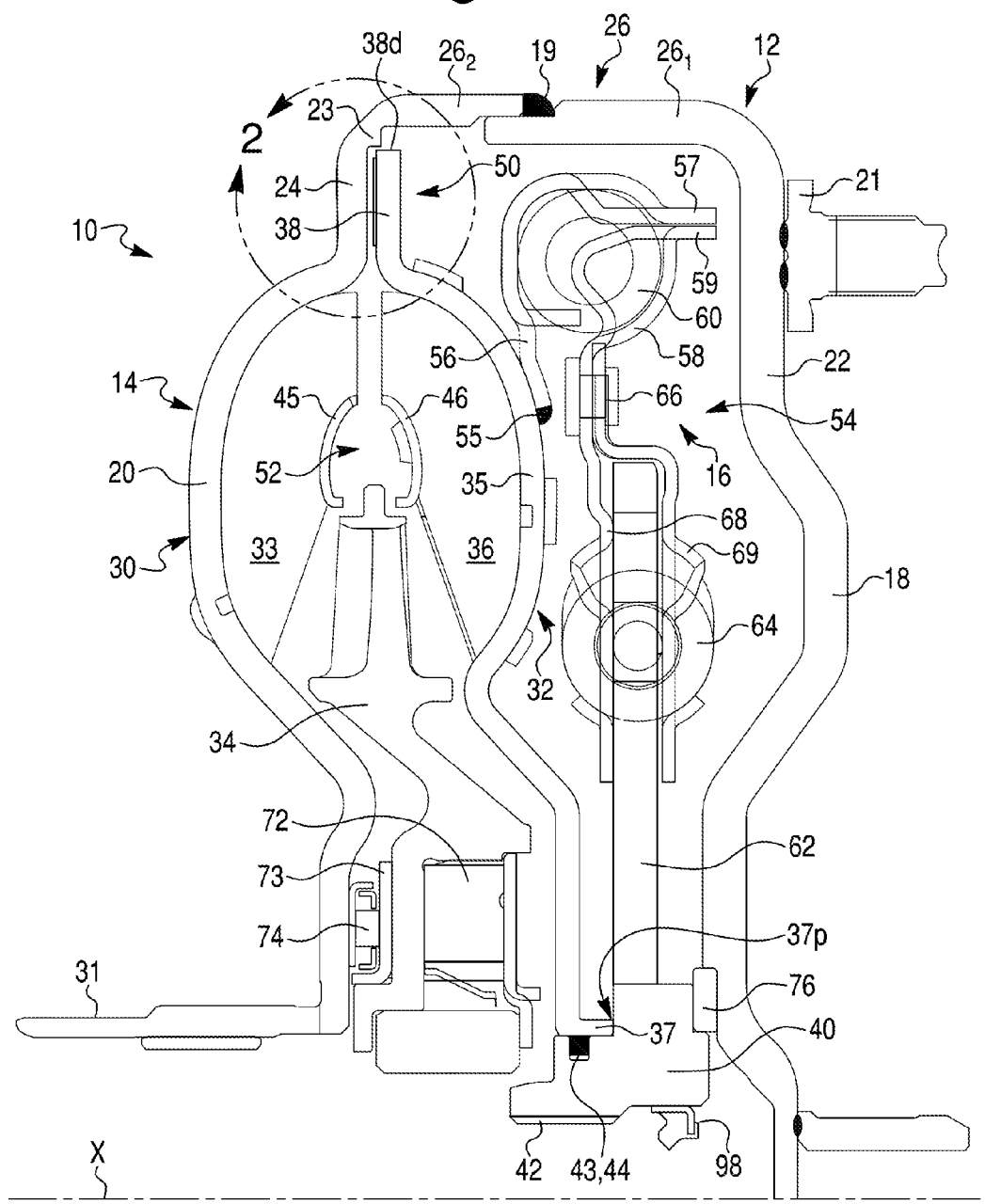
FIG. 1 is a fragmented half-view in axial cross section of a hydrokinetic torque coupling device equipped with a turbine-piston in accordance with an exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper," "lower," "right," "left," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims mean "at least one."

An exemplary embodiment of a hydrokinetic torque coupling device is generally represented in the accompanying drawings by reference numeral 10, as best shown in the fragmentary sectional view in FIG. 1. The hydrokinetic torque coupling device 10 is operable to fluidly or mechanically couple a driving shaft and a driven shaft of a motor vehicle, such as an automobile. In the typical case, the driving shaft is an output shaft of an internal combustion engine (not shown) of the motor vehicle and the driven shaft is connected to an automatic transmission of the motor vehicle.

The hydrokinetic torque coupling device 10 includes a sealed casing 12 filled with a fluid, such as oil or transmission fluid. The sealed casing 12, a hydrodynamic torque converter 14 and a torsional vibration damper (also referred to herein as a damper assembly) 16 are all rotatable about a rotational axis X. The drawings discussed herein show half-views, that is, the cross section of a portion or fragment of the hydrokinetic torque coupling devices above rotational axis X. Generally, the device 10 is symmetrical about the rotational axis X. Herein, the axial and radial orientations are considered with respect to the rotational axis X of the torque coupling device 10. The relative terms such as "axially," "radially," and "circumferentially" are with respect to orientations parallel to, perpendicular to, and circularly around the rotational axis X, respectively.

The sealed casing 12 according to the first exemplary embodiment as illustrated in FIG. 1 includes a first casing shell 18 and a second casing shell 20 fixedly and sealingly connected together, such as by weld 19 at their outer peripheries, so as to be non-movable relative to one another yet rotatable about the axis X. The first shell 18 is interconnected to and non-movable relative to the driving shaft, more typically a flywheel that is fixed to and non-rotatable relative to the driving shaft, so that the casing 12 turns at the same speed that the engine operates. Specifically, in the illustrated embodiment of FIG. 1 the casing 12 is rotationally driven by the internal combustion engine and is coupled and non-rotatable relative to the flywheel thereof with studs 21. Each of the first and second casing shells 18, 20 may be made, for example, integrally by press-forming one-piece metal sheets.

The first casing shell 18 includes a first sidewall portion 22 extending substantially radially relative to the direction from the rotational axis X (i.e., in a plane that is generally transverse to the rotational axis X) and a cylindrical first outer wall portion $26_1$ extending substantially axially from the first sidewall portion 22 toward the second casing shell 20. The second casing shell 20 includes a second sidewall portion 24 extending substantially radially relative to the direction from the rotational axis X, an elbow portion 23 extending from the second sidewall portion 24 at an oblique angle of approximately forty-five (45) degrees to the rotational axis X, and a cylindrical second outer wall portion $26_2$ extending substantially axially from the elbow portion 24 toward the first casing shell 18. The first and second outer wall portions $26_1$, $26_2$ collectively establish an annular outer wall 26 extending substantially parallel with the rotation axis X. The weld 19 fixedly secures the outer wall portions $26_1$ and $26_2$ together. Although not shown, the casing 12 may include additional components, such as an annular cylindrical shell welded at opposite ends to and interconnecting the first and second outer wall portions $26_1$, $26_2$ together.

Figure 2:
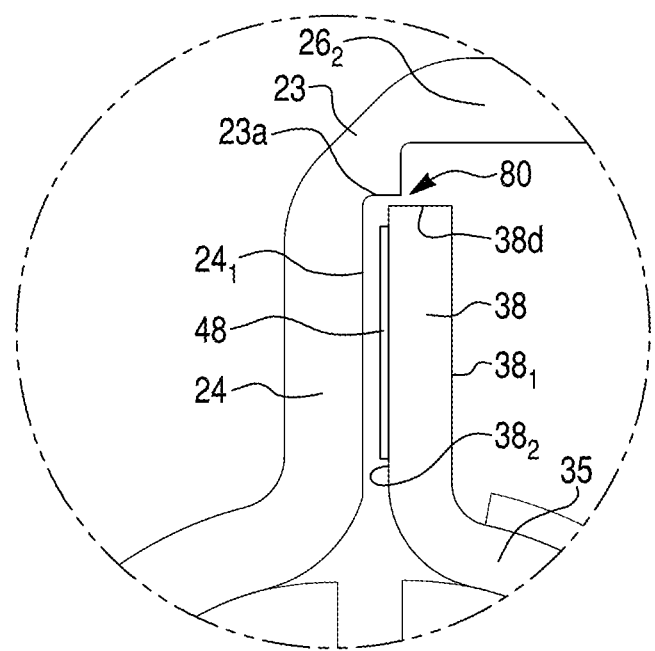
FIG. 2 is an enlarged fragmentary view of circle 2 of FIG. 1 showing the hydrokinetic torque coupling device of the exemplary embodiment out of lockup mode.
Figure 3:
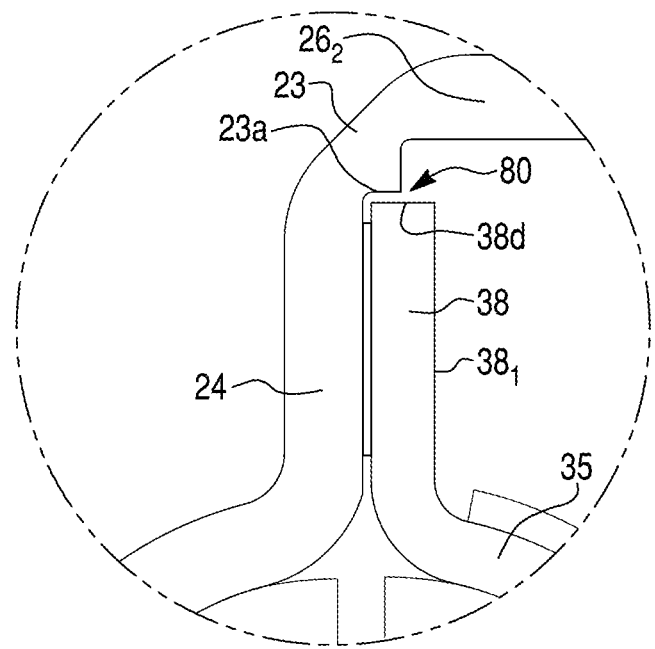
FIG. 3 is an enlarged fragmentary view of circle 2 of FIG. 1, but with the hydrokinetic torque coupling device of the exemplary embodiment shown in the lockup mode.

The second sidewall portion 24 includes a first engagement surface region $24_1$ extending substantially radially, as best shown in FIGS. 2 and 3. The elbow portion 23 includes an inner surface region 23a extending substantially axially, as best shown in FIGS. 2 and 3. The elbow portion 23 has a non-uniform, and at places reduced thickness at the inner surface region 23a. In connection with this illustrated embodiment, the inner surface region 23a establishes a first flow restriction surface region of a flow restriction feature. By way of example, the flow restriction feature of the inner surface region 23a may be formed by machining, such as with a lathe, stamping, or other processes.

The torque converter 14 includes an impeller (sometimes referred to as the pump or impeller wheel) 30, a turbine-piston 32, and a stator (sometimes referred to as the reactor) 34 situated axially between and operatively connecting the impeller 30 and the turbine-piston 32. The impeller 30, the turbine-piston 32, and the stator 34 are coaxially aligned with one another on the rotational axis X. The impeller 30, the turbine-piston 32, and the stator 34 collectively form a torus. The impeller 30 and the turbine-piston 32 may be fluidly (or hydrodynamically) coupled to one another as known in the art.

The second casing shell 20 of the casing 12 also forms and serves as the impeller shell of the impeller 30. Accordingly, the impeller shell 20 sometimes is referred to as part of the casing 12. The impeller 30 further includes an impeller core ring 45, and a plurality of impeller blades 33 fixedly attached, such as by brazing, to the impeller shell 20 and the impeller core ring 45. The impeller 30, including its shell 20, the impeller core ring 45, and the impeller blades 33, is secured to the first casing shell 18 so as to be non-rotatable relative to the casing 12 and hence to the drive shaft (or flywheel) of the engine so that the impeller 30 rotates at the same speed as the engine output. The impeller 30 includes an impeller hub 31 fixedly secured to the impeller shell 20. The impeller hub 31 is arranged for engagement with a hydraulic pump of the transmission.

The turbine-piston 32 is a consolidation or incorporation of a turbine with a lockup clutch piston. The turbine component of the turbine-piston 32 includes a turbine-piston shell 35, a core ring 46, and a plurality of turbine-piston blades 36 fixedly attached, such as by brazing, to the core ring 46 and the turbine-piston shell 35. The spinning of the impeller 30 causes transmission fluid in the torus to spin the turbine-piston blades 36, and hence the core ring 46 and the turbine-piston shell 35. The impeller shell 20 and the turbine-piston shell 35 collectively define a substantially toroidal inner chamber (or torus chamber) 52 therebetween. As discussed in further detail below, a drive member 56 is affixed to the turbine-piston shell 35, such as by an annular weld 55 and/or fasteners, to extend outside of the torus chamber 52.

The piston component of the turbine-piston 32 includes a substantially annular, planar (i.e., flat) turbine-piston flange (or turbine-piston wall) 38. The turbine-piston flange 38 is distal to the rotational axis X relative to a proximal flange 37 discussed below. The turbine-piston flange 38 is a radial extension to the turbine-piston shell 35 and, as illustrated in FIG. 1, is disposed radially outside of the turbine-piston blades 36. The turbine-piston flange 38 and the turbine-piston shell 35 are embodied as integral with one another, e.g., made of a single or unitary component. Alternatively, the turbine-piston flange 38 and the turbine-piston shell 35 may be separate components connected together by a weld or fasteners.

The turbine-piston flange 38 extends from a radially outer peripheral end of the turbine-piston shell 35 radially outward, transverse to rotational axis X, to terminate at a distal end 38d (FIGS. 2 and 3) in spaced relationship to the inner surface region 23a. In connection with this illustrated embodiment, the distal end 38d provides a second flow restriction surface region extending axially. The first flow restriction surface region 23a and the second flow restriction surface region 38d are shown parallel and spaced relative to one another to establish a restricting part of a fluid passageway 80.

The turbine-piston flange 38 has a first surface $38_1$ and an opposite second engagement surface region $38_2$ respectively facing away from and towards the first engagement surface region $24_1$ of the second sidewall portion 24. The first and second engagement surface regions $24_1$ and $38_2$ are parallel to and face one another, and extend radially at a 90 degree angle relative to the rotational axis X. The turbine-piston 32 is axially displaceable to move the second engagement surface region $38_2$ axially toward and away from the first engagement surface region $24_1$ to position the coupling device 10 into and out of a lockup mode, respectively.

In accordance with the exemplary embodiment, the second engagement surface region $38_2$ is provided with a friction ring (or friction lining) 48, best shown in FIG. 2, which shows a lockup clutch 50 out of the lockup mode. The friction ring 48 may be secured to the second engagement surface region $38_2$, for example, by adhesive bonding and/or with fasteners. The friction ring 48 is made of a friction material for improved frictional performance. Alternatively, a friction ring (or friction lining) may be secured to the first engagement surface region $24_1$. According to still another embodiment, a first friction ring or liner is secured to the first engagement surface region $24_1$ and a second friction ring or liner is secured to the second engagement surface region $38_2$. It is within the scope of the invention to omit one or both of the friction rings.

Returning to FIG. 1, the stator 34 is positioned between the impeller 30 and the turbine-piston 32 to redirect fluid from the turbine-piston 32 back to the impeller 30 in an efficient manner. The stator 34 is typically mounted on a one-way clutch 72 to prevent the stator 34 from counter-rotation. A thrust bearing 74 is shown situated between a side wall plate 73 of the stator 34 and the impeller shell 20 of the casing 12.

The hydrokinetic torque coupling device 10 further includes an output hub 40 that is rotatable about the rotational axis X. The output hub 40 is operatively coupled to and coaxial with the driven shaft. For example, the output hub 40 may be provided with internal splines 42 for coupling the output hub 40 non-rotatably relative to the driven shaft, such as a transmission input shaft, provided with complementary external splines or grooves. Alternatively, a weld or other connection may be used to fix the output hub 40 to the driven shaft. A radially outer surface of the output hub 40 includes an annular slot 43 for receiving a sealing member, such as an O-ring 44. A sealing member 98 may be mounted to a radially inner peripheral surface of the output hub to create a seal at the interface of a transmission input shaft (not shown) and the output hub 40.

Extending axially at a radially inner peripheral end of the turbine-piston shell 35 is a substantially cylindrical flange 37 that is proximate to the rotational axis relative to the distal end 38d of the turbine-piston flange 38. The substantially cylindrical flange 37 of the turbine-piston 32 is rotatable relative to the output hub 40. The sealing member (e.g., O-ring) 44 received in the slot 43 creates a seal at the interface of the substantially cylindrical flange 37 and the output hub 40. As discussed in further detail below, the turbine-piston 32 is axially movably relative to the output hub 40 along this interface. Abutment of a proximal end 37p of the flange 37 against the output hub 40, as shown in FIG. 1, limits axial displacement of the turbine-piston 32 to a maximum axial displacement position. The output hub 40 thus acts as a stop feature with respect to axial displacement of the turbine-piston 32.

The damper assembly 16 is housed in the casing 12 axially between the turbine-piston 32 and the first casing shell 18, as shown in FIG. 1. The torsional vibration damper 16 includes the drive member 56, a plurality of first (or radially outer) circumferential elastic damping members 60, an intermediate member 58 drivenly coupled to the drive member 56 through the first circumferential damping members 60, a plurality of second (or radially inner) circumferential elastic damping members 64, and a driven (or output) member 62 drivenly coupled to the intermediate member 58 through the second circumferential damping members 64. Thus, the drive member 56 establishes and input part of the damper assembly 16, while the driven member 62 establishes and output part of the damper assembly 16. The first circumferential damping members 60 are radially outward from the second circumferential damping members 64. According to the exemplary embodiment of FIG. 1 and other embodiments discussed herein, the first and second damping members 60, 64 are configured as helical (or coil) springs having principal axes oriented substantially circumferentially. Other elastic members may be selected to replace or supplement the springs.

The drive member 56 is fixedly connected to the turbine-piston shell 35 of the turbine-piston 32, such as by weld 55, which may be a continuous, annular weld bead. The output side of the drive member 56 has a plurality of driving tabs 57 (FIG. 1) extending axially in the direction away from the turbine-piston 32. The driving tabs 57 of the drive member 56 are circumferentially equidistantly spaced from one another, and engage circumferential ends of the first damping members 60.

The intermediate member 58 has a plurality of driven tabs 59 extending axially in an opposition direction to the driving tabs 57 of the drive member 56. The driven tabs 59 of the intermediate member 58 are circumferentially equidistantly spaced from one another, and engage the opposite circumferential ends of the first damping members 60 than the driving tabs 57. The intermediate member 58 and the driven tabs 59 of the damper assembly 16 are rotatable relative to the drive member 56 and the driving tabs 57 due to elasticity of the first damping members 60, which absorb torsional vibration.

Additionally, the driving tabs 57 of the drive member 56 are axially movable relative to the driven tabs 59 of the intermediate member 58. This relative axial movement between the driving tabs 57 and the driven tabs 59 may become necessary during axial movement of the turbine-piston shell 35 between its lockup and non-lockup modes. As discussed in greater detail below, when the turbine-piston shell 35 shifts axially due to a lockup event, the driving tabs 57 move axially relative to the driven tabs 59. Thus, the drive member 56 is both axially and circumferentially moveable relative to the intermediate member 58, and generally to the damping assembly 16.

The radially inner portion of the intermediate member 58 forms or is connected to, and may be integrally formed as a single piece with, a first disk part 68 on a first side of the second damping members 64. The first disk part 68 is secured to and non-movable relative to a second disk part 69 on the opposite side of the second damping members 64, such as by rivets 66 or welding. The first and second disk parts 68, 69 establish an input part to the second damping members 64.

The driven member 62 establishes an output part of the second damping members 64. The driven member 62 has windows in which the second damping members 64 are set. The disk parts 68, 69 engage first ends of the second damping members 64, and the driven member 62 engages second ends of the second damping members 64. The disk parts 68, 69 of the intermediate member 58 are thus rotatable relative to the driven member 62, with the second damping members 64 absorbing torsional vibration due to their elasticity.

The driven member 62 is fixedly connected to so as to be non-rotatable relative to the output hub 40. The non-rotatable connection between the driven member 62 and the output hub 40 may be formed by splines or welding. Alternatively, the output hub 40 and driven member 62 may be integrally formed as a single-piece part. A thrust bearing 76 is positioned between the output hub 40 and the first casing shell 18. A radially inner surface of the output hub 40 includes splines 42 for engaging (non-rotatably relative to) the driven shaft of the transmission.

As discussed above, the turbine-piston 32 is axially movable toward and away from the impeller shell 20 between a lockup position and a non-lockup (open) position. Axial movement of the turbine-piston 32 is accomplished by changing the pressure differential between the opposite sides of the turbine-piston shell 35. If a spring is present (for example between the stator 34 and the turbine-piston shell 35 or elsewhere) for urging the turbine-piston shell 35 into or out of lockup, the biasing force of that spring should be taken into account in determining pressures. Referring to FIG. 1, the torus chamber 52 is to the left side of the turbine-piston shell 35, and a damper chamber 54 is to the other (right) side of the turbine-piston shell 35. A pressure increase in the damper chamber 54 relative to the torus chamber 52 (or stated differently a pressure decrease in the torus chamber 52 relative to the damper chamber 54) acts with or against the urging force of the optional biasing member to shift the turbine-piston shell 35 axially in the direction of torque transmission, i.e., towards the output side of the casing 12, that is right to left in FIG. 1, into the lockup mode. On the other hand, a pressure decrease in the damper chamber 54 relative to the torus chamber 52 (or stated differently a pressure increase in the torus chamber 52 relative to the damper chamber 54) acts with or against the urging force of an optional biasing member to shift the turbine-piston shell 35 and the turbine-piston flange 38 axially against the direction of torque transmission, i.e., towards the input side of the casing, that is left to right in FIG. 1, out of the lockup mode. Pressure changes are created by control of the fluid, e.g., hydraulic fluid or oil, in the chambers 52 and 54.

Depending on conditions, when the torque converter 14 is transmitting torque in hydrodynamic mode, the action of the transmission fluid generates axial forces that urge the turbine-piston 32 towards the impeller 30. In certain circumstances, such as under some stable and transient conditions, those axial forces can unintentionally move the turbine-piston flange 38 into contact with the impeller 30 (at engagement surface regions $24_1$, $38_2$) and cause the torque converter 14 to prematurely enter lockup mode. Instances of unintentional lockup can be reduced by including and/or increasing the biasing force of a spring located between the stator 34 and the turbine-piston shell 35. However, an increase in spring biasing force can also slow the lockup response time of the turbine-piston 32, and thereby increase the pressure necessary to axially displace the turbine-piston 32 into lockup mode.

The hydrodynamic torque coupling device 10 includes a pressure-drop feature that can eliminate, or at least reduce instances of, unintended lockup while avoiding or at least reducing the problems presented by a spring. The pressure-drop feature of the illustrated exemplary embodiment includes a fluid passageway 80 connecting the torus chamber 52 to the damper chamber 54. The fluid passageway 80 extends between the first and second engagement surface regions $24_1$, $38_2$ and between the first and second flow restriction surface regions 23a, 38d when the torque converter 14 is out of the lockup mode, as best shown in FIG. 2. When the torque converter 14 is in lockup mode, the frictional engagement of the first and second engagement surface regions $24_1$, $38_2$ substantially closes the fluid passageway 80. Notably, the friction ring 48 may have circumferentially spaced grooves (not shown) extending generally radially so as to fluidly connect the torus chamber 52 and the damper chamber 54 with one another in the lockup mode for cooling friction surfaces of the lockup clutch 50 by the working fluid.

FIGS. 1 and 2 illustrate the torque converter 14 in a maximum axial displacement position, or fully open position, in which abutment of the proximal end 37p of the flange 37 of the turbine-piston shell 35 against the output hub 40 limits axial displacement of the turbine-piston 32. In this maximum axial displacement position, the distance (or gaps width) between the first and second engagement surface regions $24_1$, $38_2$ is greater than the distance (or gap width) between the first and second flow restriction surface regions 23a, 38d. The greater restriction to the fluid passageway 80 created by the flow restriction surface regions 23a, 38d (which are radially outside of the engagement surface regions $24_1$, $38_2$) increases the pressure drop between the torus chamber 52 and the damper chamber 54. This heightened pressure drop reduces the possibility of unintended/premature axial displacement of the turbine-piston 32 into lockup mode.

In the lockup mode, the turbine-piston shell 35 is displaced axially towards the impeller 30 until the frictional ring 48 of the second engagement surface region $38_2$ of the turbine-piston flange 38 (which moves axially with the turbine-piston shell 35) abuts against and is non-rotatably frictionally coupled to the first engagement surface region $24_1$ of the casing 12. In the lockup mode, torque is transferred from the engine to the casing 12, then by way of the frictional engagement between surface regions $24_1$ and $38_2$ (or the frictional ring(s) 48 thereof) through the turbine piston shell 35 to the drive member 56 welded thereto, then serially to the damping assembly 16 and the output hub 40. Thereby, the turbine-piston flange 38 and the casing 12 together create a lockup clutch 50 that bypasses the hydrodynamic fluid coupling of the torque converter 14 and mechanically locks the driving and driven shafts to one another.

As the turbine-piston 32 moves axially into the lockup position as described above, the driving tabs 57 of the drive member 56 welded to the turbine-piston shell 35 are axially displaced relative to the driven tabs 59 of the intermediate member 58. The axial movement of the driving tabs 57 relative to the driven tabs 59 allows the intermediate member 58, the driven member 62, and the damping members 60, 64 to remain fixed axially on the output hub 40 while the turbine-piston 32 and the drive member 56 move in the axial direction.

In the non-lockup mode, the turbine-piston 32 is displaced axially away from the impeller 30, axially moving the turbine-piston shell 35 and the turbine-piston flange 38 so that the second engagement surface region $38_2$ (or the frictional lining 48 thereof) is spaced from and no longer non-rotatably frictionally coupled to the first engagement surface region $24_1$. Thus, torque transferred from the engine to the casing 12 does not bypass the torque converter 14 through the lockup clutch 50. Driving tabs 57 move axially towards the driven tabs 59 as the lockup clutch 50 is moved from lockup to non-lockup mode. Notably, in the non-lockup mode hydraulic fluid is free to flow between the torus chamber 52 and the damper chamber 54 through the fluid passageway 80.

In operation, the lockup clutch 50 is generally activated after the hydrodynamic coupling of the driving and driven shafts, typically at relatively constant speeds, in order to avoid the loss of efficiency caused in particular by slip phenomena between the turbine-piston 32 and the impeller 30. Because of the axial pressures acting on the turbine-piston 32 for movement between its lockup and non-lockup positions, the turbine-piston shell 35 may be made somewhat thicker than typical turbine shells that do not form or function as the lockup piston. Although not shown, a biasing member, such as a spring, may be included in the hydrokinetic torque coupling device 10 to axially urge the turbine-piston 32 into or out of lockup mode.

The turbine-piston 32 both forms the shell component of the turbine and the piston component of the lockup clutch 50, as described above. By consolidating two components that are normally separate from one another into a single component, space is saved in the hydrokinetic torque coupling device 10. This space-saving structure provides several design options. For example, the hydrokinetic torque coupling device 10 can be made smaller and lighter. Alternatively, the free space within the casing 12 can be used to add additional components, such as damping components. Additionally, and as discussed in greater detail below, the drive component 56 simplifies assembly of the hydrokinetic torque coupling device 10.

Various modifications, changes, and alterations may be practiced with the above-described embodiment. Other variations and modifications include modifying the damper assembly 16 to include only damping members 60 or damping members 64, or to include additional or no damping members. The features of the above-described embodiments may be practiced with one another and are substitutable in numerous combinations.

Figure 4:
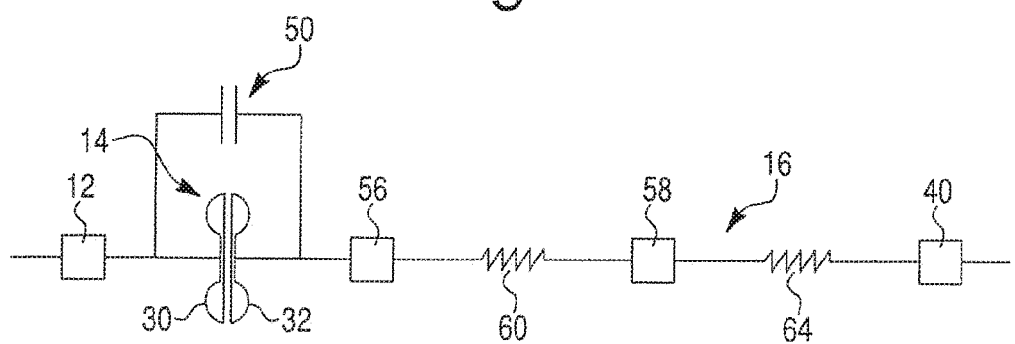
FIG. 4 is a simplified diagram of a hydrodynamic torque coupling device including a turbine-piston with a dual or double damper assembly.

The torque converters and hydrodynamic torque coupling devices described herein may incorporate different damper assemblies. For example, FIG. 4 shows a hydrodynamic torque coupling device including the impeller 30 and the turbine-piston 32 for establishing the hydrodynamic transmission mode and the lockup clutch 50 for lockup mode transmission. The impeller 30/turbine-piston 32 combination and the lockup clutch 50 are arranged parallel to one another and serially between the casing 12 and the turbine-piston shell 35. The elastic damping members 60, the intermediate member 58, and the elastic damping members 64 of the damper assembly 16 and the output hub 40 are arranged serially downstream of the turbine-piston shell 35 and the drive member 56 in FIG. 4. The diagram of FIG. 4 generally corresponds to the arrangement of the embodiments shown in FIGS. 1-3.

Figure 5:
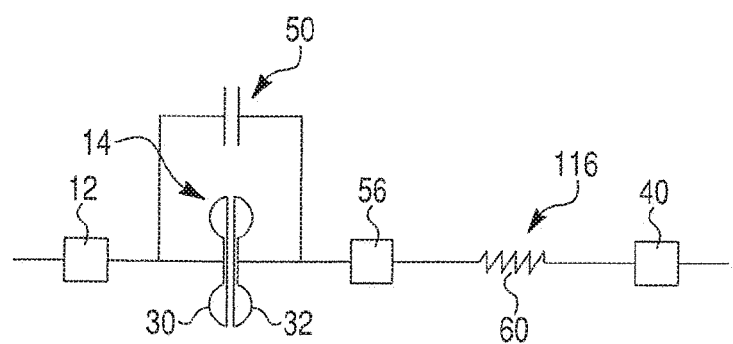
FIG. 5 is a simplified diagram of another hydrodynamic torque coupling device including a turbine-piston with a single damper assembly.

FIG. 5 shows an alternative damper assembly 116 similar to that of FIG. 4, but in which the damper assembly 116 is modified to include only one set of circumferentially extending elastic damping members 60.

Figure 6:
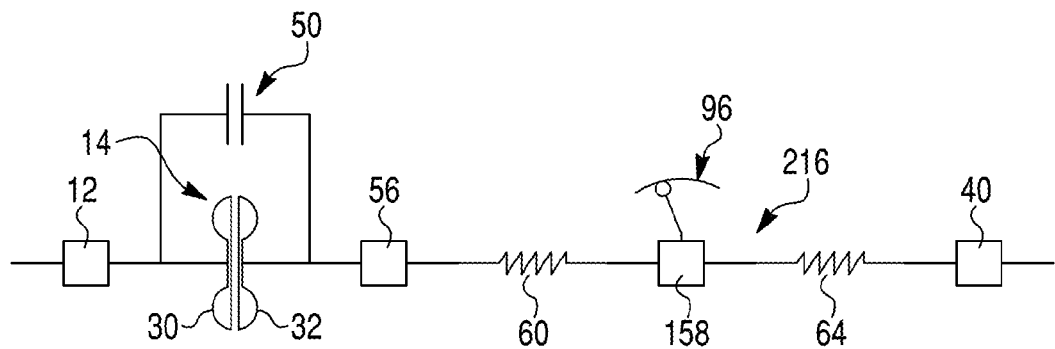
FIG. 6 is a simplified diagram of still another hydrodynamic torque coupling device including a turbine-piston with dual or double damper assemblies and a pendulum vibration absorber.

A damper assembly 216 shown in FIG. 6 is similar to that of FIG. 4, but further includes a centrifugal pendulum oscillator 96 coupled to the intermediate member 158. Centrifugal pendulum oscillators (or pendulum vibration absorbers) are well known in the art and described in, for example, U.S. patent application Ser. No. 14/305,128 filed Jun. 16, 2014, GB598811 to Stone, U.S. Pat. No. 6,026,940 to Sudau, and EP1744074 to Grahl. The centrifugal pendulum oscillator 96 may be coupled to the circumference of the intermediate member 158 and may be arranged on both sides of the intermediate member 158.

Figure 7:
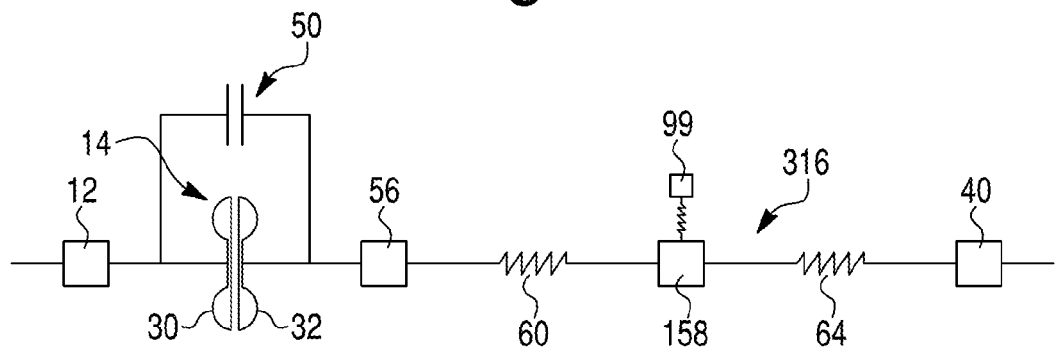
FIG. 7 is a simplified diagram of a further hydrodynamic torque coupling device including a turbine-piston with dual or double damper assemblies and a vibration absorbing spring-mass system.

A damper assembly 316 shown in FIG. 7 is similar to that of FIG. 4, but further includes a spring mass system 99 coupled to the intermediate member 158. Spring-mass systems are well known in the art and described in, for example, WO 2004/018897 to Haller. The spring-mass system 99 may be coupled to the circumference of the intermediate member 158. The spring of the spring-mass system 99 may be a coil spring, such as a steel spring. The damper may be any linear or non-linear damper, including for example a viscous damper. The spring and mass may be embodied as two components or one integral component. The spring-mass system may have a linear or non-linear constant or variable stiffness, and a constant or variable mass.

The features of the above-described embodiments are substitutable in numerous combinations.

An exemplary method for assembling the hydrokinetic torque coupling device 10 according to the embodiment of FIGS. 1-3 will now be explained. This exemplary method is not the exclusive method for assembling the hydrokinetic torque coupling devices described herein. While the method for assembling the hydrokinetic torque coupling device 10 may be practiced by sequentially performing the steps as set forth below, it should be understood that the method may involve performing the steps in different sequences.

The impeller 30, the turbine-piston 32, the stator 34, and the damper 16 may each be preassembled. The turbine-piston 32 includes, as noted above, the turbine-piston shell 35 and the turbine-piston blades 36 attached to the turbine-piston shell 35 and the turbine-piston core ring 46. The impeller 30, the stator 34, and the turbine-piston 32 subassemblies are assembled together as shown in the drawings. The cylindrical flange 37 of the turbine-piston 32 is mounted to slidingly engage the output hub 40 (splined with or mounted on the driven shaft). The damper assembly 16 is added. The driving tabs 57 are engaged with the damper assembly 16 as described above. The drive member 62 may be welded or otherwise fixedly connected to the output hub 40. The first casing shell 18 is non-moveably and sealingly secured, such as by welding at 19, to the second casing shell 20, as best shown in FIG. 1.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque coupling device for coupling together a driving shaft and a driven shaft, the hydrokinetic torque coupling device rotatable about a rotational axis and comprising:
   a casing comprising an impeller shell and a casing shell connected to and non-rotatable relative to the impeller shell, the casing being rotatable about the rotational axis and having a damper chamber;
   torque converter coaxially aligned with and rotatable about the rotational axis, the torque converter having a torus chamber and comprising
      an impeller rotatable about the rotational axis and comprising the impeller shell having a first engagement surface region and a first flow restriction surface region;
      an axially displaceable turbine-piston coaxially aligned with and hydrodynamically drivable by the impeller to rotate about the rotational axis, the turbine-piston comprising a turbine-piston shell and a turbine-piston flange having a second engagement surface region and a second flow restriction surface region facing the first engagement surface region and the first flow restriction surface region, respectively; and
      a stop feature configured to prevent axial displacement of the turbine-piston in a
   direction away from the impeller beyond a maximum axial displacement position,
   wherein the turbine-piston is axially displaceable relative to the impeller to move the second engagement surface region towards and away from the first engagement surface region for positioning the hydrokinetic torque coupling device between a lockup mode in which the turbine-piston is mechanically locked to so as to be non-rotatable relative to the impeller and a non-lockup mode in which a fluid passageway extends through a first gap between the first and second engagement surface regions and a second gap between the first and second flow restriction surface regions to place the torus chamber and the damper chamber in fluid communication with one another, and
   wherein axial displacement of the turbine-piston into the maximum axial displacement position provides the first gap with a greater width than the second gap.

2. The hydrokinetic torque coupling device of claim 1, wherein at least one of the first engagement surface region and the second engagement surface region comprises a friction lining.

3. The hydrokinetic torque coupling device of claim 1, wherein the first flow restriction surface region of the impeller shell is established by an inner surface region of the impeller shell, the impeller shell having a non-uniform thickness at the inner surface region.

4. The hydrokinetic torque coupling device of claim 1, wherein the impeller shell comprises an elbow portion extending at an oblique angle to the rotational axis, wherein the first flow restriction surface region of the impeller shell is established by an inner surface region of the elbow portion, the impeller shell having a non-uniform thickness at the inner surface region.

5. The hydrokinetic torque coupling device of claim 4, wherein the oblique angle is approximately forty-five degrees relative to the rotational axis.

6. The hydrokinetic torque coupling device of claim 1, wherein the turbine-piston flange has a radially outer distal end establishing the second flow restriction surface region.

7. The hydrokinetic torque coupling device of claim 1, wherein the turbine-piston flange is integrally formed with the turbine-piston shell.

8. The hydrokinetic torque coupling device of claim 1, further comprising a stator situated between the impeller and the turbine-piston.

9. The hydrokinetic torque coupling device of claim 1, wherein the first and second flow restriction surface regions extend axially.

10. The hydrokinetic torque coupling device of claim 1, wherein the first and second flow restriction surface regions remain parallel to one another throughout axial displacement of the turbine-piston into and out of the lockup mode.

11. The hydrokinetic torque coupling device of claim 1, wherein:
the impeller shell comprises an elbow portion extending at an oblique angle to the rotational axis, wherein the first flow restriction surface region of the impeller shell is established by an inner surface region of the elbow portion, the impeller shell having a non-uniform thickness at the inner surface region;
the turbine-piston flange extends radially to terminate at a radially outer distal end establishing the second flow restriction surface region; and
the first and second flow restriction surface regions extend axially.

12. The hydrokinetic torque coupling device of claim 1, wherein the stop feature comprises an output hub.

13. The hydrokinetic torque coupling device of claim 1, further comprising a damper assembly comprising an input part drivenly connected to the turbine-piston and an output part operatively connectable to an output hub.

14. The hydrokinetic torque coupling device of claim 13, wherein the input part of the damper assembly is non-rotatably connected to the turbine-piston and axially movable relative to the output part.

15. The hydrokinetic torque coupling device of claim 13, wherein the damper assembly further comprises circumferential torsional vibration dampers interconnecting the input part rotatably relative to the output part.

16. The hydrokinetic torque coupling device of claim 13, wherein the damper assembly further comprises an intermediate member, a first set of circumferentially extending elastic damping members drivingly coupling the input part to the intermediate member, a second set of circumferentially extending elastic damping members drivingly coupling the intermediate member to the output part, and a centrifugal pendulum oscillator mounted to the intermediate member, and wherein the output part is connected to and non-rotatable relative to the output hub.

17. The hydrokinetic torque coupling device of claim 13, wherein the damper assembly further comprises an intermediate member, a first set of circumferentially extending elastic damping members drivingly coupling the input part to the intermediate member, a second set of circumferentially extending elastic damping members drivingly coupling the intermediate member to the output part, and a spring mass system coupled to the intermediate member, and wherein the output part is connected to and non-rotatable relative to the output hub.

18. The hydrokinetic torque coupling device of claim 1, wherein the turbine-piston is axially displaceable towards an output side of the hydrokinetic torque coupling device in order to frictionally couple the first and second engagement surface regions together and position the hydrokinetic torque coupling device in the lockup mode, and wherein the turbine-piston is axially movable towards an input side of the hydrokinetic torque coupling device so that the first and second engagement surface regions are not frictionally coupled with one another and the hydrokinetic torque coupling device is not in the lockup mode.

19. A method of assembling a hydrokinetic torque coupling device for coupling a driving shaft and a driven shaft together, comprising:
providing a torque converter having a torus chamber and comprising an impeller including an impeller shell having a first engagement surface region and a first flow restriction surface region, an axially displaceable turbine-piston comprising a turbine-piston shell and a turbine-piston flange having a second engagement surface region and a second flow restriction surface region facing the first engagement surface region and the first flow restriction surface region, respectively, and a stop feature configured to prevent axial displacement of the turbine-piston in a direction away from the impeller beyond a maximum axial displacement position; and
operatively connecting the torque converter to a casing shell and a damper assembly to establish a damper chamber in which the damper assembly is situated, wherein the turbine-piston is axially displaceable relative to the impeller to move the second engagement surface region towards and away from the first engagement surface region for positioning the hydrokinetic torque coupling device between a lockup mode in which the turbine-piston is mechanically locked to so as to be non-rotatable relative to the impeller and a non-lockup mode in which a fluid passageway extends through a first gap between the first and second engagement surface regions and a second gap between the first and second flow restriction surface regions to place the torus chamber and the damper chamber into fluid communication with one another, and wherein axial displacement of the turbine-piston into the maximum axial displacement position provides the first gap with a greater width than the second gap.

20. A method of operating a hydrokinetic torque coupling device comprising a torque converter, a casing shell, and a damper assembly situated in a damper chamber, the torque converter having a torus chamber and comprising an impeller including an impeller shell having a first engagement surface region and a first flow restriction surface region, an axially displaceable turbine-piston comprising a turbine-piston shell and a turbine-piston flange having a second engagement surface region and a second flow restriction surface region facing the first engagement surface region and the first flow restriction surface region, respectively, and a stop feature configured to prevent axial displacement of the turbine-piston in a direction away from the impeller beyond a maximum axial displacement position, said method comprising:

axially displacing the turbine-piston towards the impeller to move the second engagement surface axially towards and into frictional engagement with the first engagement surface to mechanically and non-rotatably lock the turbine-piston to the impeller; and axially displacing the turbine-piston away from the impeller to move the turbine-piston into the maximum axial displacement position in which a fluid passageway extends through a first gap between the first and second engagement surface regions and a second gap between the first and second flow restriction surface regions to place the torus chamber and the damper chamber into fluid communication with one another, and the first gap is greater in width than the second gap.

* * * * *